United States Patent [19]

Nakayama

[11] Patent Number: 4,583,613
[45] Date of Patent: Apr. 22, 1986

[54] THREE WHEEL MOTORCYCLE WITH REVERSE MECHANISM

[75] Inventor: Hitoshi Nakayama, Saitama, Japan

[73] Assignee: Honda Giken Kogyo Kabushiki Kaisha, Tokyo, Japan

[21] Appl. No.: 583,027

[22] Filed: Feb. 23, 1984

[30] Foreign Application Priority Data

Feb. 25, 1983 [JP] Japan ................................ 58-29367

[51] Int. Cl.⁴ .............................................. B60K 28/10
[52] U.S. Cl. ................................... 180/283; 180/215; 180/271; 123/198 DC
[58] Field of Search .... 123/198 D, 198 DB, 198 DC; 180/282, 283, 284, 215, 271; 192/0.08, 4 C; 74/879, 878, 858, 857

[56] References Cited

U.S. PATENT DOCUMENTS 3,327,553 6/1967 Peras .............................. 192/0.08 X
4,276,972 7/1981 Burnett et al. ..................... 192/4 C

FOREIGN PATENT DOCUMENTS 2092665 9/1982 United Kingdom ........... 123/198 D

*Primary Examiner*—Henry Bennett
*Attorney, Agent, or Firm*—Lyon & Lyon

[57] ABSTRACT

The present invention relates to a three wheeled motor vehicle with an electronic speed control system for controlling the speed of the vehicle while in reverse operation. The electronic speed control system includes a speed detection circuit and reverse gear detection circuit to alter the ignition of the vehicle. By altering the ignition, further acceleration may be prevented.

4 Claims, 8 Drawing Figures

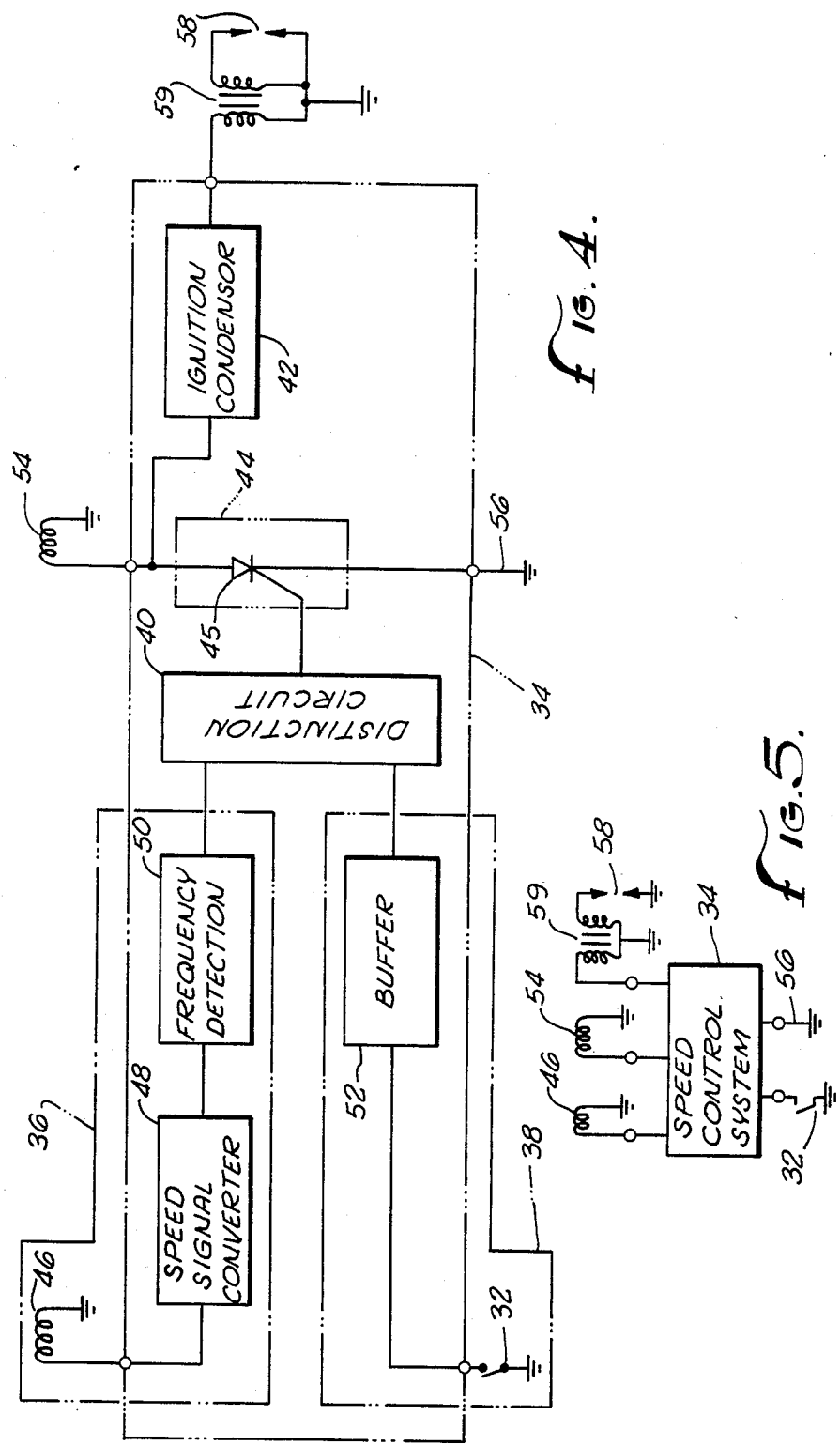

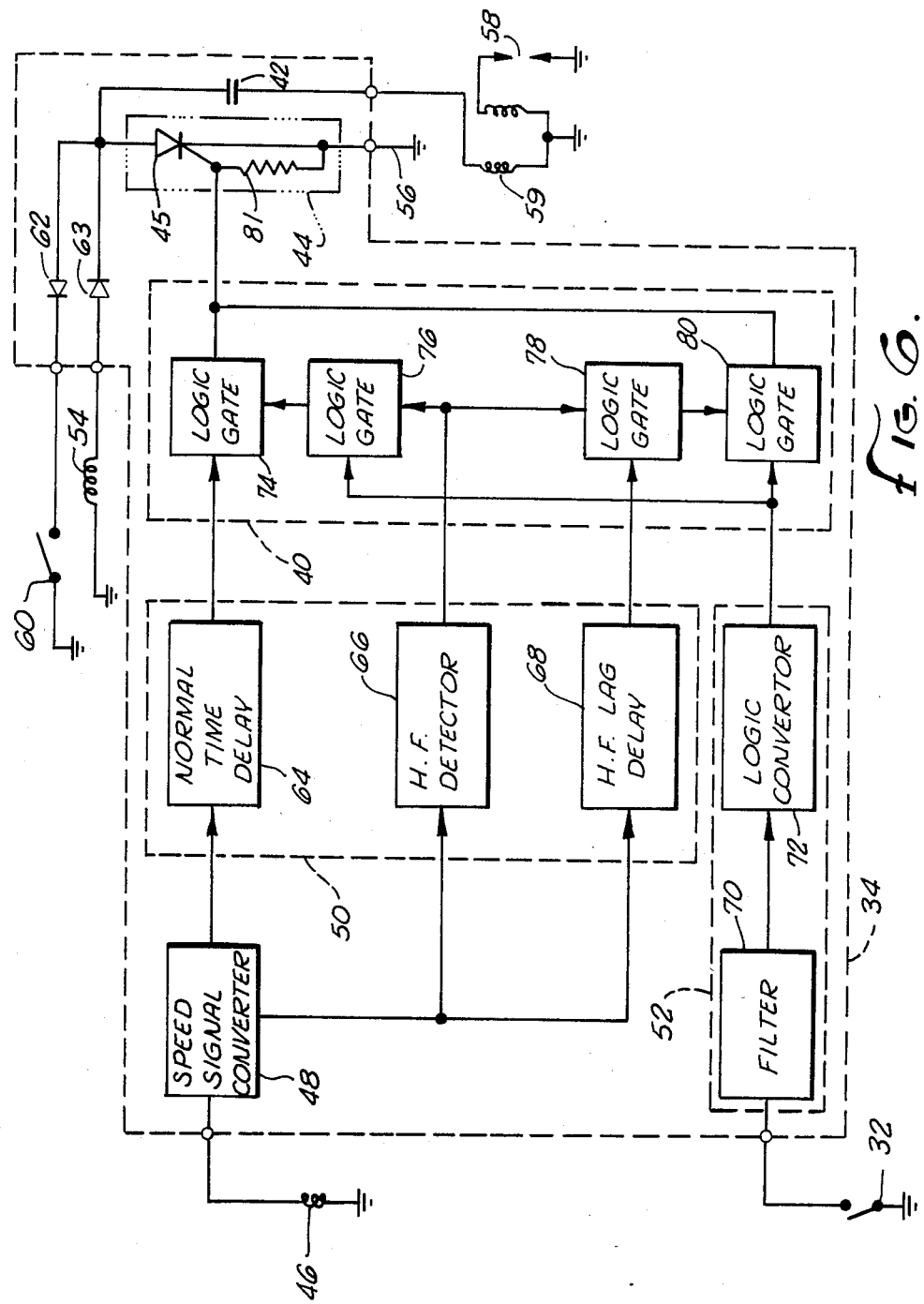

THREE WHEEL MOTORCYCLE WITH REVERSE MECHANISM

BACKGROUND

The field of the present invention is speed control for vehicles.

Three wheeled motor vehicles which are used primarily for off-road use have been equipped with reverse movement capabilities for various purposes, e.g. to change direction when an obstacle appears ahead. Such vehicles generally employ a handlebar steering system with an accelerator grip located on the handlebar. In situations when reverse is to be employed, an operator will often look back while operating in reverse. As riders are generally less familiar with reverse operation, controlling the vehicle using the handlebar steering and the accelerator grip while looking back can be difficult.

One difficulty in reverse operation is accurate speed control. Because a broad power range is necessary for forward operation, excessive power is available for reverse operation. Consequently, an operator may find throttle control through the narrow range necessary for reverse operation relatively difficult.

SUMMARY

It is an object of the present invention to aid in the control of a three wheeled motor vehicle while operating in the reverse direction.

The present invention relates to the use of an electronic speed control system. The speed control system has three primary functions. The system is enabled when the vehicle is in reverse. In this way, excessive actuation of the throttle will not result in excessive speeds and possible loss of control.

The speed control system senses when the three wheeled vehicle is both operating in reverse and the revolution rate is in excess of a preset value. Under such conditions, the control system acts to fully or partially disable the ignition. The system may modify the ignition timing of the engine so as to limit the speed of operation. If an operator were operating a vehicle employing such a system in reverse and purposely or mistakenly attempts to accelerate the vehicle to a speed that corresponds to a revolution rate in excess of the preset value, the speed control system may automatically retard the ignition timing of the vehicle so as to reduce power. Thus, there is a corresponding limitation of the speed of the three wheeled vehicle while in reverse operation. Under this automatic control of vehicle speed, the vehicle may be more easily controlled.

One further improvement of the present invention is the use of a reverse switch that is combined with the speed control system, such that, even in the event of a reverse switch failure, the electronic speed control system will still limit the speed of the vehicle when in reverse operation.

These and other advantages will become more apparent in the following description of the preferred embodiments.

DRAWING DESCRIPTION

FIG. 4 is a speed control system schematic.

FIG. 5 is a control system diagram.

FIG. 6 is a speed control system schematic including a lag circuit.

PREFERRED EMBODIMENTS

Figure 1:
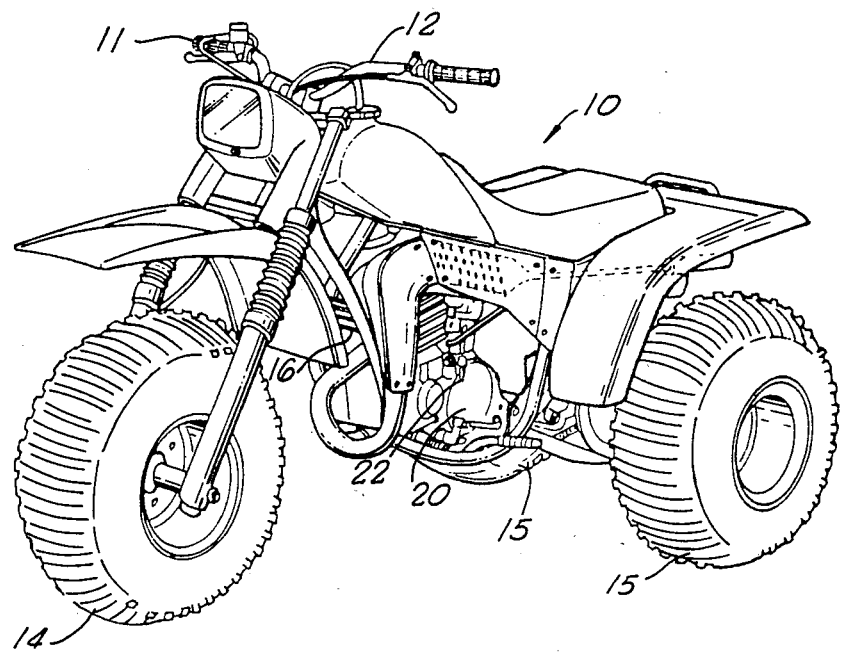
FIG. 1 is an oblique view of a three wheeled motor vehicle.

Referring to FIG. 1, a three wheeled motor vehicle 10 is depicted. The three wheeled motor vehicle 10 is accelerated by the use of an accelerator grip 11 which is mounted on handle bars 12. The handle bars 12 are used by the operator for steering. The vehicle 10 is supported by a front wheel 14 and a pair of rear wheels 15.

The vehicle 10 has an engine 16 which is a source of power for accelerating the vehicle 10 as is conventional in the art. A transmission 20 is coupled with the engine 16. The transmission 20 includes gears, not shown, used for transmitting power to the rear wheels 15 at different velocities as is well known in the art. Attached to the transmission 20 is a change lever 22 which is used for selecting one of a plurality of gear ratios.

Figure 2:
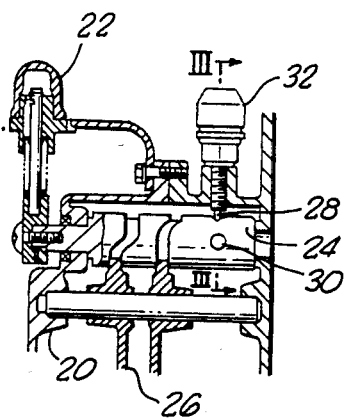
FIG. 2 is a side elevation in cross section of a transmission shift mechanism.

Referring to FIG. 2, the change lever 22 is coupled with the transmission 20 through the use of a shift drum 24. Manual rotation of the change lever 22 by the operator of the vehicle 10 causes the shift drum 24 to rotate. As the shift drum 24 rotates, a shift fork 26 moves, thereby causing the selection of one of a plurality of gears of the transmission 20.

The shift drum 24 can be rotated by the operator of the vehicle 10 into one of three positions according to this preferred embodiment, though no particular number of positions is significant. A click pin 28 is biased against the shift drum 24 and is inserted into one of three detent holes 30. Each of the detent holes 30 is arranged at a location of the shift drum 24 corresponding to one of the gear selections. As the change lever 22 is rotated, a resulting rotation of the shift drum 24 occurs. This rotation causes the shift forks 26 to select one of the gears and simultaneously causes one of the detent holes 30 to be positioned under the click pin 28.

As the click pin 28 engages a detent hole 30, the shift drum 24 is locked into position. The click pin 28 is used in part to stabilize the rotational position of the shift drum so as to lock the shift drum 24 into one of three positions selected by the operator. As the shift drum 24 is rotated, the click pin 28 is inserted and extracted from the holes 30. The click pin 28 moves upwardly when leaving a hole 30 and downwardly when entering into a detent hole 30. As the click pin 28 moves into and out of the reverse position, a reverse switch 32 opens and closes.

Figure 3:
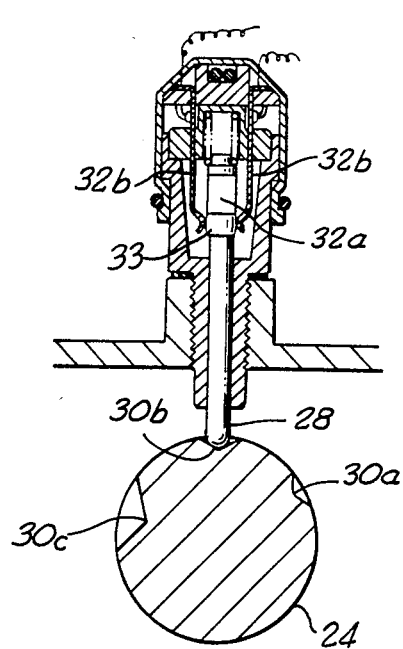
FIG. 3 is a side elevation of a reverse switch attached to the transmission.

Referring to FIG. 3, there are three holes 30a, 30]b and 30c representing three transmission positions. The reverse hole 30c references a reverse operation when rotated to a position directly under the click pin 28. The click pin 28 moves downwardly towards the center of the shift drum 24 to a maximum extent when the click pin 28 is positioned over detent hole 30c. This maximum extension into the shift drum 24 indicates a reverse condition.

The reverse switch 32 is designed so as to detect when the click pin 28 is at maximum extension. The reverse switch 32 has a movable part 32a and non-movable parts 32b. As the click pin 28 moves upwardly and downwardly, the movable part 32a moves correspondingly. An open condition between the non-movable parts 32b exists only when the click pin 28 is inserted to the maximum extent allowed by the reverse detent hole 30c. A closed condition between the non-movable parts 32b exists when the click pin 28 is positioned over holes 30b or 30a or is in between detent holes 30. A conduction band 33 provides for electrical conduction between the non-movable parts 32b. Consequently, the reverse switch 32 can detect the reverse position by virtue of a closed circuit condition or an open circuit condition.

It should be noted that this particular preferred embodiment as described in FIG. 3 contemplates an open condition referencing the reverse condition. However, modification of the click pin 28 can be obtained by repositioning the conduction band 33 along movable part 32a thereby providing a closed conditioned for the reverse condition and an open condition for the other conditions.

Referring to FIG. 4, the reverse switch 32 is connected to a speed control system 34. The speed control system 34 includes a speed detection circuit 36, a reverse detection circuit 38, a distinction circuit 40, an ignition condensor 42 and an ignition trigger circuit 44.

The speed detection circuit 36 includes a generator 46, though the generator 46 is not physically located within the speed control system. The generator 46 is used as a mechanism to provide electronic signals that are related to the velocity of the three wheeled vehicle 10 by indicating the revolution rate of the engine 16. Other mechanisms may be used to provide signals which relate to the revolution rate of the engine 16 as well.

The generator 46 normally presents an analog or sinusoidal type signals as is common in the art. A speed signal convertor 48 receives the electronic signals from the generator 46 and converts them to digital type signals for subsequent processing. A frequency detection circuit 50 monitors the digital signals presented by the speed signal convertor 48. The frequency detection circuit 50 can determine if the frequency at which the digital signals presented by the speed signal convertor 48 are in excess of a preset value. There are many techniques with which to store a preset value in an electronic circuit and such techniques are well known in the art. Additionally, there are many techniques by which to measure the time between successive pulses so as to determine whether or not the frequency rate is above such a preset value and such techniques are also well known in the art.

A buffer circuit 52 is connected to the reverse switch 32. The reverse switch 32 provides an open circuit condition or a closed circuit condition to ground 56 depending upon the reverse switch 32 position. The buffer circuit 52 is used to filter noise transients that could possible occur and emanate from the reverse switch 32. Additionally, the buffer circuit 52 can convert the open circuit and closed circuit conditions of switch 32 to corresponding logic levels and such filtering and conversion techniques are well known in the art.

The buffer circuit 52 presents a logic signal to the distinction circuit 40 indicating whether or not the reverse switch 32 is in an open or closed condition. It should be noted that the reverse switch 32 is not physically a part of the control system 34 even though it electronically interacts with it.

During operation of the three wheeled vehicle 10 the distinction circuit 40 provides firing pulses, that is, ignition pulses, to the ignition trigger circuit 44. However, when in the reverse condition as represented by logic signals from the buffer circuit 52 and when the revolution rate of the engine is in excess of the preset values as represented by the frequency detection circuit 50, the distinction circuit 40 can either stop transmitting the ignition pulses or alter the ignition pulses by shifting the ignition pulses relative to the engine piston position.

In normal operation, ignition timing is generally determined by the relative angular rotation of the engine 16. Firing at the appropriate time optimizes the performance of the engine. However, by eliminating the pulses or altering them from their optimum timing the engine 16 momentarily quits or operates inefficiently to cause a reduction of power to the vehicle 10.

An excitor coil 54, which is connected to the ignition trigger circuit 44, the system ground 56 and the ignition condensor 42, is used to charge the ignition condensor 42 as is well known in the art. The ignition trigger circuit 44 includes a SCR (silicon controlled rectifier is also known as a thyrister) as the primary means for discharging the ignition condensor 42. Though this preferred embodiment uses the SCR, other means may be employed such as NPN transistors.

At the time of ignition, the distinction circuit 40 presents a firing pulse to the SCR 45. Upon receipt of the firing pulse, the SCR 45 conducts electricity. As the SCR conducts electricity, the ignition condensor 42 is discharged through the SCR 45. As the ignition condensor 42 discharges, a spark occurs at an ignition plug 58 resulting from high voltage conditions occurring across an ignition coil 59. Thus, the distinction circuit 40 is used to control the firing of the ignition plug 58.

Referring to FIG. 5, the speed control system 34 is shown as an electronic control system which attaches to various components located in and about the three wheel vehicle 10. The reverse switch 32, generator 46, excitor coil 54, ignition coil 59, ignition plug 58, and system ground 56 are connected to the speed control system 34.

Referring to FIG. 6, an improved speed control system 34 is depicted. A kill switch 60 is connected to the control system 34. The kill switch 60 is connected to a kill switch diode 62. When the kill switch 60 is closed by the operator, the system ground 56 connects to the diode 62 so as to discharge the ignition condensor 42, such that ignition of the ignition plug 58 is thereafter prohibited.

The kill switch diode 62 permits current in only one direction and that direction is toward the system ground 56 through the kill switch 60. The rectifying action of the kill switch diode 62 prohibits transient electrical conditions from charging the condensor 42 through the kill switch diode 62. The kill switch diode is not required but is provided to prevent transients from damaging or effecting other electrical components within the speed control system 34.

Frequency detection is enhanced in this preferred embodiment by including a normal time delay circuit 64, a high frequency detection circuit 66 and a high frequency lag delay circuit 68. The normal time delay circuit 64 is used for delaying firing pulses from the speed signal convertor 48 to the distinction circuit 40 so as to fire the ignition plug 48 at its normal, optimum and expected time.

The high frequency detection circuit 66 is used for detecting a high frequency condition of the engine 16. The high frequency lag delay circuit 68 is used to present a delayed or lag firing pulse referenced to the output of speed signal convertor 48. The high frequency lag delay circuit 68 presents a firing pulse that is delayed in time with respect to the normal time delay pulse that is presented by the normal time delay circuit 64. Thus, the normal time delay circuit 64 generates normal firing pulses where the high frequency lag delay circuit 66 presents similar pulses which lag in time with respect to the firing pulses presented by the normal time delay circuit 64. By providing delayed pulses, the engine is operated smoothly though there is a lack of power, preventing acceleration.

In the preferred embodiment of FIG. 6., the buffer 52 is further divided into a filter 70 and a logic convertor 72. The filter 70 is used for filtering transient electrical conditions emanating from the reverse switch 32 while the logic convertor 72 converts the signal coming from the filter 70 to logic electronic signals compatible with the requirement of the distinction circuit 40. The filter 70 may comprise resistor and capacitor networks or logic digital filters and the like and such techniques are well known in the art. The logic convertor 72 may convert open circuit or closed circuit conditions to TTL compatible logic levels and such conversion techniques are well known in the art. The logic convertor circuit may have input protection circuits to prevent damage by electrical transient emanating from the reverse switch 32.

The distinction circuit 40 comprises a plurality of logic gates used for presenting firing pulses to the triggering circuit 44. The triggering circuit 44 in turn causes the firing of the ignition plug 58 through the use of the ignition condensor 42.

A logic gate 76 recognizes the condition of high engine speed by the output of the high frequency detection circuit 66, and recognizes the reverse condition by an output from the logic convertor 72. If there is a high speed condition and a reverse condition then the logic gate 76 disables a logic gate 74. When the logic gate 74 is disabled, the normal delay firing pulse from the normal time delay circuit 64 are not propagated through the logic gate 74 to the ignition triggering circuit 44. On the other hand, when the logic gate 74 is not disabled by the logic gate 76, the logic gate 74 does propagate the firing pulse from the normal time delay circuit to the ignition triggering circuit 44.

A logic gate 78 is used to propagate a lag firing pulses from the high frequency lag delay circuit 68 to the logic gate 80 only when enabled by the output of the high frequency detection circuit 66 at high engine speed. When a high frequency condition exists, the lag delay firing pulse is propagated to a logic gate 80 through the logic gate 78. If the high frequency condition does not exist then the output from the high frequency detection circuit 66 disables the logic gate 78 which in turn disables the logic gate 80.

The logic gate 80 is enabled by the output from the logic convertor 72. Thus the logic gate is enabled by both the logic gate 78 and the logic converter 72. The logic gate 80 will propagate a lag delay firing pulse to the ignition trigger circuit 44 only during both a reverse condition and a high frequency revolution condition. Consequently, the ignition triggering circuit 44 is pulsed by either the logic gate 74 or the logic gate 80 in a mutually exclusive manner. This particular embodiment employs a wired-or condition at the outputs of logic gate 74 and logic gate 80, but, this wired-or condition may be effectuated by another logic element. Resistor 81 is used for loading the logic gate 74 and the logic gate 80 so as to provide the appropriate voltage level and current into the SCR 45.

Figure 7:
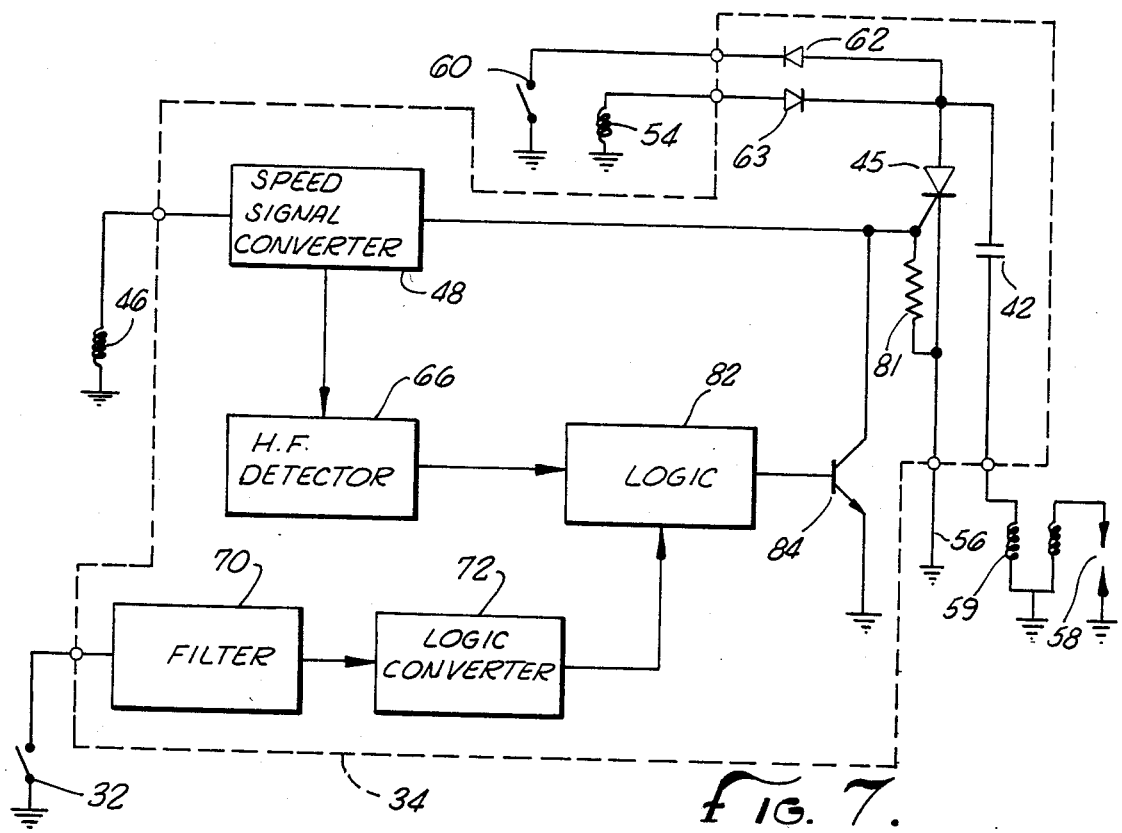
FIG. 7 is a speed control system schematic including an NPN transistor used for ignition.

Referring to FIG. 7, the preferred embodiment discloses a simple design of the speed control system 34. The speed control system 34 uses a logic circuit 82 and a transistor 84 for preventing pulses to the SCR 45. Normal firing pulses in this configuration initiate from the speed signal convertor 48 for firing the ignition plug 58 during normal operation. The logic circuit 82 can be used for simple detection of a high speed revolution rate condition and concurring reverse condition when monitoring the high frequency detection circuit 66 and the logic convertor 72, respectively.

The logic circuit 82 is used to control the operation of the transistor 84. When the transistor 84 is on and conducting, no pulses are presented to the SCR 45 thereby preventing ignition of the ignition plug 85.

Figure 8:
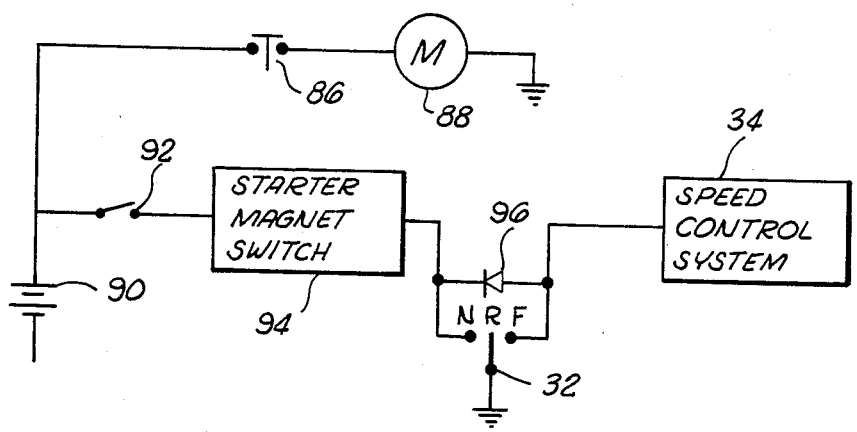
FIG. 8 is a speed control system diagram including a fault-protection reverse-switch design.

Referring to FIG. 8, this preferred embodiment provides a safety enhancement. A push button starter switch 86 is used to start a starter motor 88. The starter motor 88 derives its power from a battery 90 through the starter switch 86.

An ignition switch 92 is connected between the battery 90 and a starter magnetic switch 94. The starter magnetic switch 94 is used to enable the operation of the starter motor 88. A starter diode 96 is used in conjunction with the starter switch 32 to provide safety enhancement.

It should be noted that current can only flow through the starter magnetic switch 94 when the reverse switch 32 is in the neutral position and the ignition switch 92 is closed. Thus, the starter magnetic switch 94 is activated by current only when the reverse switch 32 is in its neutral position. Thus, the starter motor 88 is only enabled when the reverse switch 32 is also in the neutral position.

The control system 34 is connected to the reverse switch 32. It should be noted that the speed control system 34 will recognize an open condition only when the reverse switch 32 is in a reverse position.

This preferred embodiment provides protection if and when the reverse switch 32 fails in the open condition. The reverse switch 32 can be constructed so that a closed contact condition can only exist when the reverse switch 32 is in a neutral or forward position. The present invention precludes high speed reverse operation even in event of a system failure. The reverse condition is defined as an open condition. If the engine is in reverse and an open failure occurs, then the limiting action is still in effect. Thus, by defining the reverse switch 32 to be open during a reverse condition, the speed limitation of the speed control system 34 is still in effect thereby effecting a safe manner of operation even in the event of an open failure.

What is claimed is:

1. A speed control system for a three wheeled vehicle having an engine and reverse gearing, comprising
    means for detecting enablement of the reverse gearing;
    means for detecting engine speed; and
    means for disabling the engine from exceeding a preselected speed when the three wheeled vehicle is in reverse and the speed of the engine exceeds the preselected speed.

2. The speed control system of claim 1 wherein said means for disabling the engine is coupled with the ignition system of the engine.

3. The speed control system of claim 2 wherein said means for disabling the engine includes ignition cutoff.

4. The speed control system of claim 2 wherein said means for disabling the engine includes ignition timing retardation.

* * * * *